US011163890B2

(12) United States Patent
Price et al.

(10) Patent No.: US 11,163,890 B2
(45) Date of Patent: Nov. 2, 2021

(54) SELF-TARGETING METHOD OF AUTOMATED CYBERSECURITY ANALYSIS ON AN OPERATING SYSTEM

(71) Applicant: United States of America as represented by the Secretary of the Navy, San Diego, CA (US)

(72) Inventors: Michael Allen Price, Levittown, PA (US); Ryan Scott Elder, Washington Crossing, PA (US); Warren Fuchs Brodsky, Lansdale, PA (US); James Hart Allphin, San Diego, CA (US)

(73) Assignee: United States of America as represented by the Secretary of the Navy, Washington, DC (US)

( * ) Notice: Subject to any disclaimer, the term of this patent is extended or adjusted under 35 U.S.C. 154(b) by 294 days.

(21) Appl. No.: 16/597,227

(22) Filed: Oct. 9, 2019

(65) Prior Publication Data
US 2021/0110044 A1 Apr. 15, 2021

(51) Int. Cl.
*G06F 21/57* (2013.01)
(52) U.S. Cl.
CPC ...... *G06F 21/577* (2013.01); *G06F 2221/033* (2013.01)
(58) Field of Classification Search
None
See application file for complete search history.

(56) References Cited

U.S. PATENT DOCUMENTS

| 8,909,926 | B2 | 12/2014 | Brandt et al. |
| 9,288,058 | B2 | 3/2016 | Pazdziora et al. |
| 9,444,849 | B2 | 9/2016 | Angus et al. |
| 9,773,122 | B2 | 9/2017 | Betzler et al. |
| 10,091,220 | B2 | 10/2018 | Shabtai et al. |
| 10,360,408 | B1* | 7/2019 | Kincaid ............... G06F 21/577 |
| 2006/0156408 | A1 | 7/2006 | Himberger et al. |
| 2013/0219156 | A1 | 8/2013 | Sears |
| 2013/0247136 | A1 | 9/2013 | Chieu et al. |
| 2015/0067844 | A1 | 3/2015 | Brandt et al. |
| 2015/0213266 | A1 | 7/2015 | Nance et al. |
| 2015/0213268 | A1 | 7/2015 | Nance et al. |
| 2018/0091558 | A1* | 3/2018 | Daugherty ............ G06F 21/577 |
| 2019/0080334 | A1* | 3/2019 | Copeland ............. G06Q 30/018 |

* cited by examiner

*Primary Examiner* — Fatoumata Traore
(74) *Attorney, Agent, or Firm* — Naval Information Wafare Center, Pacific; Kyle Eppele

(57) ABSTRACT

A self-targeting method of automated cybersecurity analysis on an operating system on a target computer. An analysis software executable defined by a core engine executable is provided to the target computer and run on the operating system shell. The analysis software executable identifies the specific operating system that is running on the target computer and then causes one or a plurality of bash scripts which correspond to the identified operating system and which have been parsed from security setting entries from a standardized guide for desired security settings. The bash scripts then automatically assess the compliance of various aspects of the target computer system with the security setting entries, generating an output that is compatible with existing viewers for entries of standardized guides.

4 Claims, 4 Drawing Sheets

| Short Option | Long Option | Description |
|---|---|---|
| -b | --browser-only | Browser check only; don't run OS check |
| -h | --help | Print this help menu and quit |
| -o | --os-only | OS check only; don't run browser check |
| -q | --quick | Quick mode; don't run SCC or system info grab |
| -r <PATH> | --results <PATH> | Specify results path <PATH>. Default is "/IA_AUDIT/ORG123/Unix" if it exists |
| -t <NUM> | --threads <NUM> | Specify number of threads (for multithreaded systems). Default is 5 |
| -T | --prompt | Prompt for a number of threads at runtime |
| -v | --version | Print version information and quit |

FIG. 3

```
CyberKnight-GO/
  README.md                              # Readme file
  CyberKnight_vX.X.X                     # Launcher Script – RUN THIS
  Cyberknight.go                         # Engine source code
  go-executable-build.sh                 # Script to build binaries
  dist/                                  # Location of binaries
    linux/
      cyberknight-linux-386              # 32-bit binary
      cyberknight-linux-amd64            # 64-bit binary
  Tools/                                 # CyberKnight Resource files
    SCC_OS_ARCH.tar.gz                   # SCC configured for a variety of OS's
    SCC_OS_ARCH.tar.gz
    ...
    ORG123.MANUAL.OS.sh                  # System analysis script, various OS's
    ORG123.MANUAL.OS.sh
    ...
  data/                                  # Checklist data
    /checklists
      STIG.ckl                           # .ckl files
      STIG.ckl
      ...
    /scripts
      STIG/                              # Corresponding bash scripts
        v-###.sh                         # Individual vulnerability script
        v-###.sh                         # Individual vulnerability script
      ...
      STIG/
        v-###.sh                         # Individual vulnerability script
        v-###.sh                         # Individual vulnerability script
      ...
```

FIG. 4

SELF-TARGETING METHOD OF AUTOMATED CYBERSECURITY ANALYSIS ON AN OPERATING SYSTEM

STATEMENT OF GOVERNMENT INTEREST FEDERALLY SPONSORED RESEARCH AND DEVELOPMENT

The United States Government has ownership rights in this invention. Licensing inquiries may be directed to Office of Research and Technical Applications, Naval Information Warfare Center, Code 72120, San Diego, Calif. 92152; telephone (619) 553-5118; email: ssc_pac_t2@navy.mil. Reference Navy Case No. 104048.

BACKGROUND OF THE INVENTION

Field of the Invention

This disclosure relates generally to cybersecurity compliance analysis processes on operating systems.

Description of the Prior Art

As computer systems become more interconnected and powerful, and as reliance on computer systems for important and/or sensitive operations increases, the need to protect computer systems and the information created and/or stored thereon from theft or damage also increases. Likewise, the need to protect the services being provided from disruption or misdirection also increases. As such, the implementation of cybersecurity (or "cyber security") technologies, processes, and practices has become an essential part of the use of computer systems in both large scale systems and networks at the enterprise level and for systems at the individual level.

Many organizations opt to implement standardized cybersecurity methodologies in order to implement security protocols, identify and eliminate potential vulnerabilities, and enhance overall security. The implementation of cybersecurity methodologies, however, can only be effective if the organization's computer systems are in fact kept in compliance therewith. Indeed, even the best designed cybersecurity methodologies can only be effective to the extent that the set-up and operation of the applicable computer systems are in fact in accordance with the standardized protocols. In other words, avoiding inconsistent and/or suboptimal implementation of standardized protocols can and will undermine cybersecurity outcomes just as the lack of standardized protocols will.

Many existing procedures for analyzing target computer systems for cybersecurity compliance entail substantial manual data entry and review. These procedures also require a human validator to have significant amounts of in-depth knowledge of the operating system on the target computer system. Therefore, there remains a need for a method which provides a validator with a highly automated cybersecurity analysis of a computer system to ensure the protocols are correctly and consistently implemented.

Referring now to FIG. 1, a conventional process of analyzing cybersecurity compliance may require validators of computer system compliance to analyze target systems from cybersecurity compliance.

In analyzing a given system, a human validator must review any number of applicable STIGs, each of which may contain up to hundreds of individual checks. This analysis is most commonly completed with the assistance of the Security Compliance Checker ("SCC") tool. Though not a requirement, the SCC tool is widely used to validate security implementation, which may be defined by cybersecurity STIG compliance. The SCC tool, when used with the latest STIG Security Content Automation Protocol ("SCAP") benchmarks for a given organization, generates results that are commonly cited artifacts in accreditation packages.

The SCC's results are provided as Extensible Configuration Checklist Description Format (XCCDF) files. These XCCDF files are not human readable and must be manually imported into an existing STIG checklist in a suitable software application, such as the STIGViewer tool, to generate a partially completed STIG checklist. This partially completed checklist provides automation of as low as fifty percent (50%) of a given STIG, provide no additional information beyond "Open"/"Not A Finding," and often contain many false positives. Thus, substantive manual action is required by the human validator in order to produce a fully completed checklist. In addition, there may be many STIGs that are not able to be processed by SCC at all and thus require the validator to manually complete the entire STIG during process of completing the checklists.

In this regard, the conventional process of analyzing cybersecurity compliance may begin with a provision of an organization's STIG and SCAP benchmarks to an SCC at step 110. Through this action, the SCC may have the latest STIG SCAP benchmarks for that organization. Then, the SCC may be executed on a target computer system at step 120. It is contemplated that the SCC may be specifically configured to check the operating system of the target computer system, and the selection and/or configuration of the SCC may be something that is required to be done manually by the validator.

The execution of the SCC on the target computer system produces its results in XCCDF, and these results may then be manually imported into a STIGViewer at step 130 to generate a partially completed STIG checklist. The validator may then manually verify and complete the rest of the STIG checklist, which typically requires running STIG commands and copying and pasting data from the target system to the checklist, at step 140. It is contemplated that during the completing of the checklist, the validator may also be required to review the results from the SCC tool for anything that is non-human readable, which may be defined as the "found" open results, and edit such non-human readable results prior to completing the checklists.

SUMMARY OF THE INVENTION

The present disclosure describes a method which provides a validator with a highly automated cybersecurity analysis of a computer system to ensure the protocols are correctly and consistently implemented. In accordance with one embodiment of the present disclosure, a self-targeting method of automated cybersecurity analysis on an operating system is provided. The method comprises the steps of: providing an analysis software executable having a plurality of analysis accompanying files to a target computer system having an operating system, wherein said analysis software executable defines a core engine executable; determining by said analysis software executable an identity of the operating system; upon determining the identity of the operating system, running at least one shell script which is among the plurality of analysis accompanying files and corresponds to the identified operating system, wherein said at least one shell script includes commands parsed from entries in at least one Security Technical Implementation Guide (STIG) checklist which direct the identified operating system to assess compliance with the entries by aspects of the target computer system; and generating an output file which causes the display of containing results from the assessment of compliance with the entries by aspects of the target computer system, wherein said output file is in format readable by a Security Technical Implementation Guide checklist viewing software application.

BRIEF DESCRIPTION OF THE DRAWINGS

FIG. 3 shows a table of optional features that may be run with the method of automated cybersecurity analysis on an operating system of a computer system in accordance with the present disclosure.

FIG. 4 shows a file directory diagram showing the organization of analysis accompanying files on a graphical user interface of a target computer system in accordance with the present disclosure.

DETAILED DESCRIPTION OF THE INVENTION

Described herein is a self-targeting method of automated cybersecurity analysis on an operating system of a computer system. The self-targeting method of automated cybersecurity analysis on an operating system may greatly increase the efficiency of analyzing cybersecurity compliance by automatically producing Security Technical Implementation Guide ("STIG") checklists with human-readable found results already entered. In addition, the method of the instant disclosure may automate more security implementation checks than existing tools, which currently provide automation of as low as fifty percent (50%) of a given STIG. Indeed, the method disclosed herein has been demonstrated to automate approximately ninety-five percent (95%) of the STIG checks for 32 and 64 bit versions of the Linux and Unix operating systems such as RedHat 5, 6, and 7, RedHawk, CentOS®, and Solaris® (x86 and SPARC) and provide the information to manually verify the rest of the findings, with the results exported in a .ckl file format which can be placed automatically into a conventional STIGViewer checklist.

Figure 1:
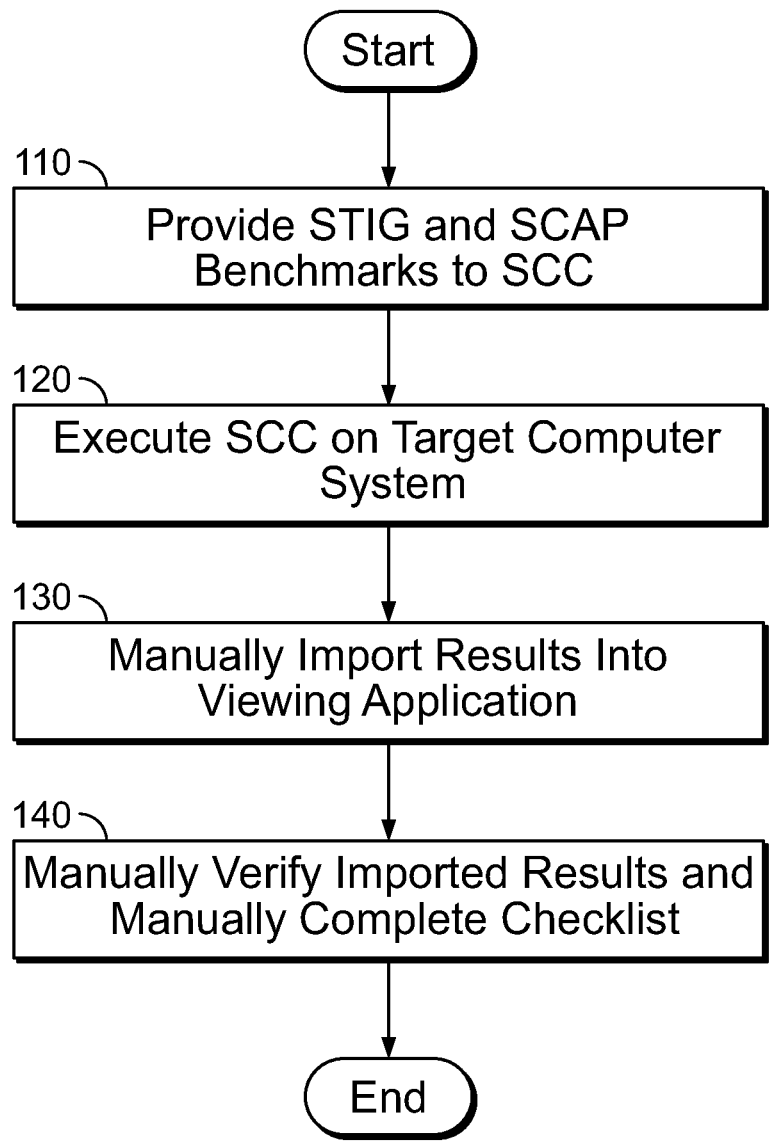
FIG. 1 shows the steps of a method of cybersecurity analysis on an operating system of a computer system in accordance with the prior art.
Figure 2:
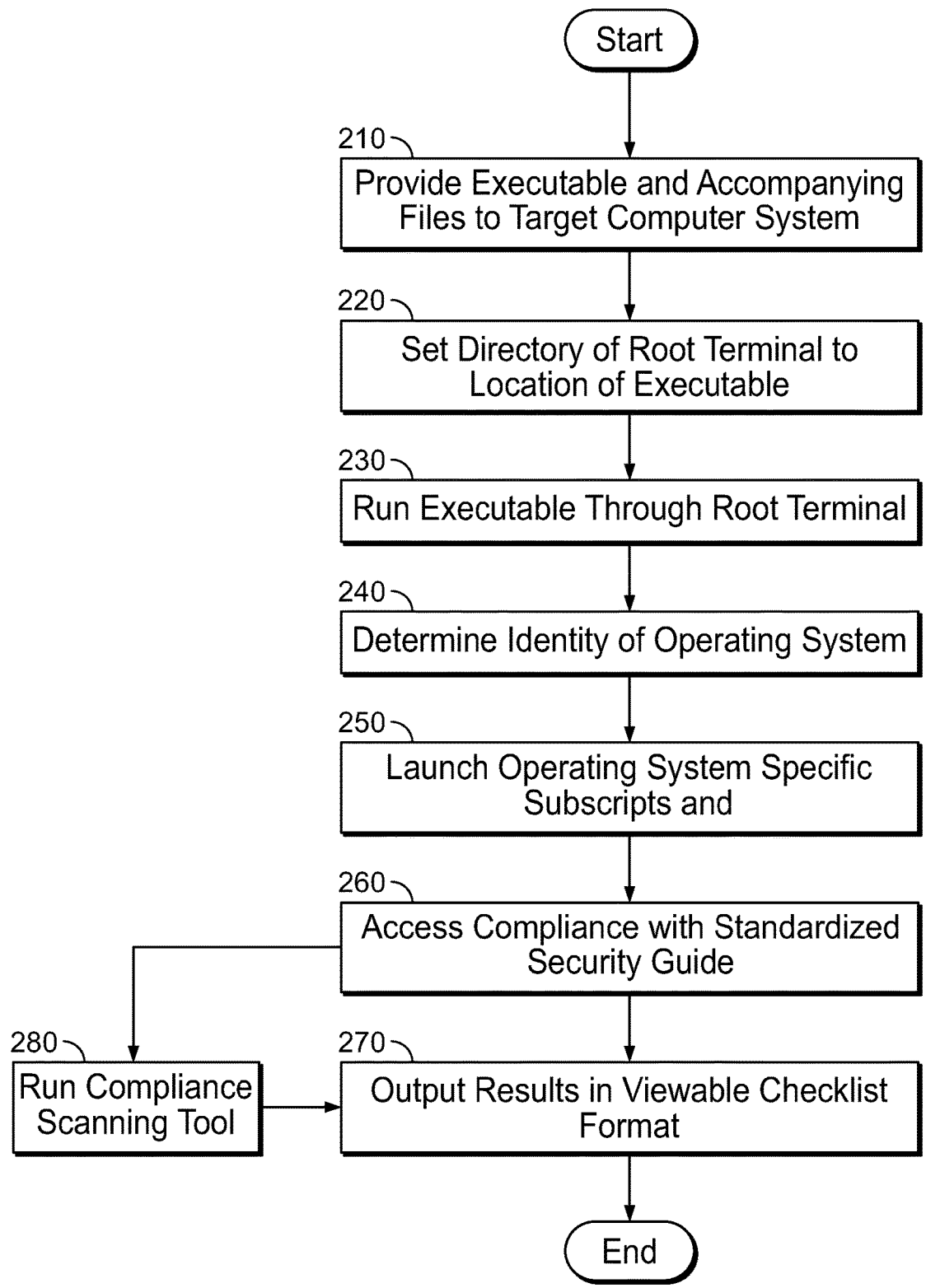
FIG. 2 shows the steps of a method of automated cybersecurity analysis on an operating system of a computer system in accordance with the present disclosure.

Referring now to FIGS. 2 and 3, the self-targeting method of automated cybersecurity analysis on an operating system is performed by an analysis software executable. This executable is designed to be run by an operating system shell of a target computer system (which is the computer system running the operating system being analyzed). The analysis software executable may be defined by an executable file that serves as a core engine. The core engine operates in conjunction with a set of analysis accompanying files, which may be defined as single or a collection of Bourne Again Shell ("bash") scripts (i.e., a plain text file which contains a series of commands executable by a Unix operating system shell) which are loaded on the target computer system with the analysis software executable. These scripts correspond to individual checks within each STIG checklist, and typically are parsed from the entries on desired STIG checklists and then modified to automate the analysis of the cybersecurity compliance for the STIG.

Upon running, the analysis software executable may determine the identity of the operating system and then launch the appropriate bash scripts out of the set of analysis-accompanying files to analyze the identified operating system and perform an assessment of its compliance with the STIG applicable thereto. The analysis software executable also collects the results of each of the launched bash scripts and generates an output of the results for each STIG in a format that is usable by a suitable viewing application, such as a .ckl file for a STIGViewer. The analysis software executable may then automatically run the SCC tool to generate XCCDF files and perform a system analysis to generate other artifact results. In this regard, the analysis software executable automates the running of an automated compliance-scanning tool, which automatically employs SCAP benchmarking to generate artifacts from a file in a format specifying security checklists, benchmarks and configuration documentation for certification and accreditation packages if such packages are desired.

The steps performed by the analysis software executable in the self-targeting method of automated cybersecurity analysis on an operating system begin with the provision of the analysis software executable along with the set of analysis accompanying files to the target computer system at step 210. It is contemplated that the analysis software executable and its analysis accompanying files may be provided to the target computer system by being copied to the memory of the computer system into a single directory. The analysis accompanying files, as discussed below and exemplified in FIG. 4, include necessary bash scripts for the analysis software executable to perform the applicable STIG on one of a number of operating systems.

Once provided to the computer system, the directory of the root terminal of the target computer system (or a terminal that has been turned into the root terminal) is set to the directory of the analysis software executable and its analysis accompanying files at step 220. From the root terminal, the analysis software executable is then run at step 230. It is appreciated that because the analysis software executable is provided as a standalone executable, any of the exemplary command line options listed in FIG. 3 may be added when the analysis software executable is run.

Upon running, the analysis software executable determines the identity of the operating system at step 240 and launches one or multiple bash scripts that correspond to the identified operating system at step 250 and the necessary STIGs. The launched bash scripts are automatically run, performing an assessment of the aspects of the operating system and/or the target computer for compliance with a corresponding applicable STIG at step 260. Then, the results from this analysis may be output as an output STIG checklist in a file format that may be viewable with a conventional STIG checklist viewing software application, such as a STIGViewer, at step 270.

The analysis software executable may also cause a compliance scanning tool that is specific to the identified operating system to run on the identified operating system at step 280 (to generate artifacts related to a file in a format specifying security checklists, benchmarks and configuration documentation for certification and accreditation packages) and perform a system analysis to generate system information artifacts.

It is contemplated that the checklist that is output may then be reviewed manually, with any remaining open items being completed manually.

It is contemplated that the analysis software executable may be designated by a user to allow specification of various settings, such as a number of threads (for multithreaded systems), which STIGs to check, whether to run SCC or not, and so forth.

It is additionally contemplated that the desired STIG checklists, information assurance tools, and automated compliance-scanning tool may be specific to an organization.

Referring now to FIG. 4, the analysis software executable may be defined by a core engine which may be written in the programming language "Go" and whose execution is initiated by a validator. In the context of the performance of a STIGs provided by a particular organization, the analysis software executable may operate from a directory entitled "ORGANIZATION" on the root partition of the target computer system and have its analysis accompanying files on a subdirectory entitled "TOOLS" therein. A plurality of discrete operating-system-specific and STIG-specific scripts may then be copied into the "TOOLS" directory. Once the analysis software executable identifies the operating system that is in use on the target computer, the collection of scripts which are specific to the identified operating system and which correspond to the STIG checks desired to be performed are run as a part of the self-targeting method of automated cybersecurity analysis on an operating system.

Also included in the "TOOLS" directory may be bundled operating system specific SCC versions. When the SCC version, which is specific to the identified operating system, is run (in addition to the collection of scripts that are specific to the identified operating system), XCCDF artifacts for certification and accreditation packages may be generated.

A text file that contains a listing of desired STIG commands may also be included in the "TOOLS" directory. This text file, which may be entitled STIG_CKL_COMMANDS.txt in the given context, is provided to provide a reference of the commands which may need to be required to be run manually if directed in the output STIG checklist as it is viewed on the STIGViewer.

After the self-targeting method of automated cybersecurity analysis on an operating system is complete, the results may be placed in the "ORGANIZATION" directory in a directory entitled "RESULTS." This "RESULTS" directory may contain the output STIG checklist, a "MANUAL" directory containing all of the captured system information, and an "SCC" folder containing the SCC results.

As the STIG commands are automatically run and the output is produced in a human-readable format, it is appreciated that the analysis software executable may be used as a validating individual with just some knowledge, such as low to moderate knowledge, of the operating system it is being run on. This benefit is further enhanced by the inclusion of a listing of desired STIG commands that potentially could be required to be run in the output STIG checklist.

It is also appreciated that even with the highly automated STIG analysis provided by the self-targeting method of automated cybersecurity analysis on an operating system, best practices may still dictate that the generate checklist be verified by a validator for accuracy and completeness, as ever finding found "open" might actually not be due to external mitigations.

It is contemplated that the analysis software executable may alternatively be run for just a single STIG checklist that is for the settings of the operating system. In such an embodiment, it may be desirable for the validator to know the version of the operating system.

It is further appreciated that because the individualized scripts in the set of analysis accompanying files may each correspond to a separate STIG, quick modification of scripts is facilitated. This is important as STIGs are updated on a quarterly basis. Making the entire process compatible with the updates simply requires updating the individual scripts corresponding to any checks that changed, and then swapping out the STIG in the appropriate Tools directory.

It will be understood that many additional changes in the details, materials, steps and arrangement of parts, which have been herein described and illustrated to explain the nature of the invention, may be made by those skilled in the art within the principle and scope of the invention as expressed in the appended claims.

What is claimed is:

1. A self-targeting method of automated cybersecurity analysis on an operating system, comprising the steps of:
   providing an analysis software executable having a plurality of analysis accompanying files to a target computer system having an operating system, wherein said analysis software executable defines a core engine executable;
   running the analysis software executable on the target computer system, wherein the step of running the analysis software executable is initiated through a root terminal;
   determining by said analysis software executable the identity of the operating system;
   upon determining the identity of the operating system, running at least one corresponding shell script which is among the plurality of analysis accompanying files and corresponds to the identified operating system, wherein said at least one corresponding shell script includes commands parsed from entries in at least one Security Technical Implementation Guide checklist which direct the identified operating system to assess compliance with the entries by aspects of the target computer system;
   wherein the steps of determining and running at least one corresponding shell script occur automatically following the step of running the analysis software executable;
   causing, upon determining the identity of the operating system, a corresponding compliance scanning tool which is among the plurality of analysis accompanying files and corresponds to the identified operating system to run so as to generate artifacts related to a file in a format specifying security checklists, benchmarks and configuration documentation for certification and accreditation packages; and
   generating an output file which causes the display of containing results from the assessment of compliance with the entries by aspects of the target computer system, wherein said output file is in format readable by a Security Technical Implementation Guide checklist viewing software application.

2. The method of claim 1, wherein:
   the step of providing an analysis software executable includes copying the analysis software executable to memory in the target computer system; and
   the step of running the analysis software executable includes copying one or more of the plurality of analysis accompanying files to memory in the target computer system.

3. The method of claim 1, wherein the at least one corresponding shell script is among a plurality of shell scripts that are among the plurality of analysis accompanying files.

4. The method of claim 1, wherein the corresponding compliance scanning tool is one of a plurality of compliance scanning tools among the plurality of analysis accompanying files.

\* \* \* \* \*